United States Patent [19]

Grataloup

[11] 3,744,725
[45] July 10, 1973

[54] PROPORTIONING DEVICE FOR GRANULATED OR PULVERULENT PRODUCTS

[75] Inventor: Xavier Roger Grataloup, Monterau, France

[73] Assignee: Societe Anonyme: Nodet-Gougis, Montereau, France

[22] Filed: Feb. 28, 1972

[21] Appl. No.: 229,692

[52] U.S. Cl............... 239/669, 239/681, 222/342
[51] Int. Cl. ........................................ A01c 17/00
[58] Field of Search............... 222/342; 239/669, 239/681, 683, 123

[56] References Cited
UNITED STATES PATENTS

| 28,173 | 5/1860 | Hill .................................. 239/669 |
| 2,772,030 | 11/1956 | Christenson et al. ............ 222/342 X |

Primary Examiner—M. Henson Wood, Jr.
Assistant Examiner—John J. Love
Attorney—Donald M. Wight et al.

[57] ABSTRACT

The invention has for object a proportioning device for granulated or pulverulent products, said device is fitted with a spigot cylinder and in which, on the one hand the various spigots are connected to the cylinder on a portion only of their width, so that a ring-shaped section is provided between any pair of adjacent spigots and the cylinder body, the width of this section approximating the active one of each spigot, and in which on the second hand the fixed fingers have a free tip such as to extend through the said ring-shaped sections up to the immediate vicinity of the peripheral surface of the rotating cylinder. The device allows a surely cleaning of the complete cylinder surface.

8 Claims, 4 Drawing Figures

PROPORTIONING DEVICE FOR GRANULATED OR PULVERULENT PRODUCTS

The present invention relates to a proportioning device for granulated or pulverulent products, particularly for products liable to agglomerate according to their hygrometric condition, such as grains and manures.

As far as agricultural machines are concerned, proportioning devices are already known for grain sowing-machines or manure dusting, and are made of a cylinder fitted with pins, rotating into a casing located at the basis of a hopper at a speed adjustable in function of the desired flow value, such a distribution being currently a so-called "spigot distribution."

When such a spigot distribution is used for products liable to agglomerate, namely due to their hygrometric condition, in particular manures, the drawback is the clogging of the cylinder between the spigots, which modifies considerably the flow value.

For preventing these difficulties, it has already been proposed to locate, in the cylindrical areas not scanned by spigots, fixed fingers brushing against the cylindrical portion and cleaning this latter. The thing is however that the cleaning of these areas between spigots, is not ensured by such scraping fingers, and that the clogging process disturbs still too much the flow which users try to make as uniform as possible.

With these known devices, it is not possible to increase the width of the areas scanned by spigots and which can only be cleaned by said scrapers ; as a matter of fact, the spigot width becomes then too small and the flow obtained through spigot radial faces pushing the product to be proportioned becomes, on the one side unstable according to the variations of fluidity of the proportioned product, and insufficient on the other side.

The object of the present invention is to provide a spigot distribution of the hereabove type, but which avoids the just described drawbacks and really cleans efficiently the maximum surface of the spigot cylinder.

For this purpose, a proportioning device having on the one hand a rotating cylinder with a number of spigot areas on its periphery, and on the other hand fixed fingers for cleaning the cylindrical surface located between the said areas, is characterized according to the invention, by the fact that the various spigots are connected to the cylinder on a portion only of their width, so that a ring-shaped section having a width approximating the active one of each spigot is available between any pair of adjacent spigots and the cylinder body, and that the fixed fingers have such a free end that it extends through the said ring-shaped sections up to the immediate vicinity of the peripheral surface of the rotatable cylinder.

Under these conditions , the spigots have an important width in their peripheral active portion, and it can be seen that they are connected to the cylinder by a grooved flash or flange which is sufficient for their fitting on the cylinder. The fingers consist of a tip matched to the profile of ring-shaped sections and located at the end of a thin member which connects them to a fixed portion of the organ, casing, hopper or other device containing the product to be proportioned.

According to another embodiment, the spigot cylinder consists of a stack of a number of disks fixed, f.i. keyed, on the shaft of rotation of the proportioning device, these disks having each at least one spigot or being slotted on a portion of their width at their periphery, independant spigots being clamped between the disks, or still not being slotted, the spigots being clamped between the disks and cut in order to provide the room for finger passing. The fingers can be articulated on their holder allowing to be locked or keyed in good position after fitting the whole.

By referring to the appended drawings, various forms of implementation of a proportioning device according to the invention have been described hereunder. In said drawings.

Figure 1:
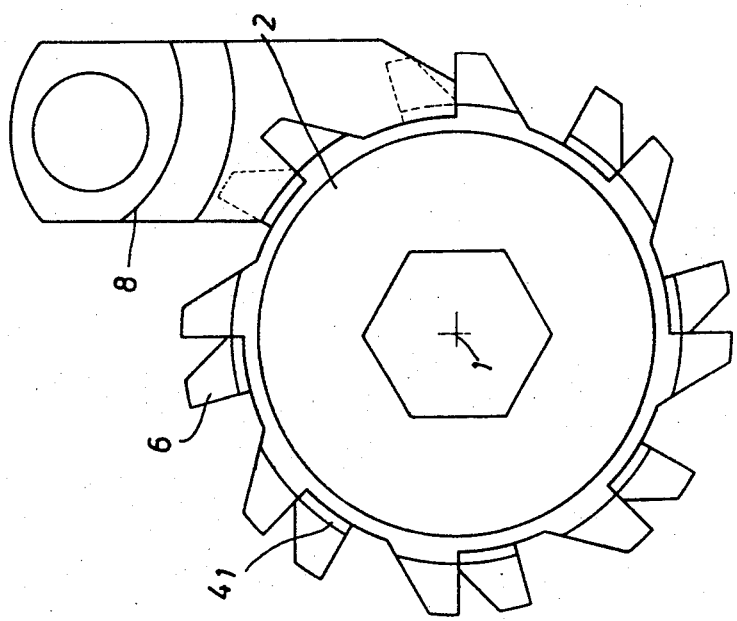
FIG. 1 is a vertical cross-section transversal view of a first example of proportioning device.
Figure 2:
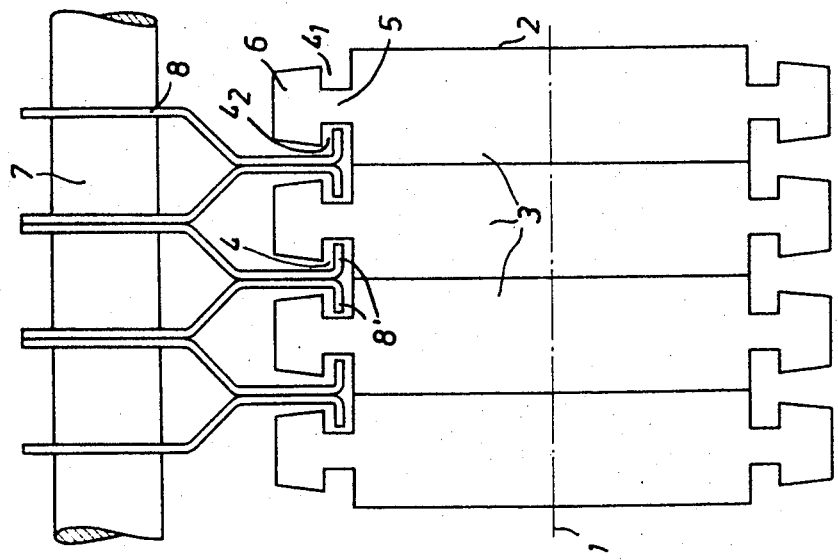
FIG. 2 is a vertical cross-section view along the longitudinal axis of the proportioning device of the FIG. 1.

In the embodiment of FIGS. 1 and 2, a cylinder 2 which is the cylindrical part of the proportioning device and consists of a number of identical disks 3 placed side by side, is fixed , or keyed, onto the shaft 1 rotatably driven by any convenient means, each of these disks is provided at its periphery of two half-sections $4_1$ and $4_2$, which are ring-shaped and separated by a flange 5 which opens out externally for providing at least one spigot 6. Between these spigots from adjacent disks, there is consequently a radial way and a ring-shaped slot consisting of two half-slots $4_1$ and $4_2$. In the FIG. 1, it can be seen that a given angular shift exists between the spigots 6 of the various disks 3.

The case, not illustrated, which contains the product to be distributed has a fixed shaft or rod 7 having T-shaped fingers 8, the horizontal members 8' of which extend through the ring-shaped sections 4.

When the product, for example grains or powder manure, is to be distributed, the shaft 1 rotates, the product, falls from the distributor and is carried by spigots 6 and further spread by any known means. Should grains, and still more manures, agglomerate due to their hygrometric condition, the horizontal members 8' of the T formed by the scraping fingers would clean actually the whole surface of the cylinder 1.

Figure 3:
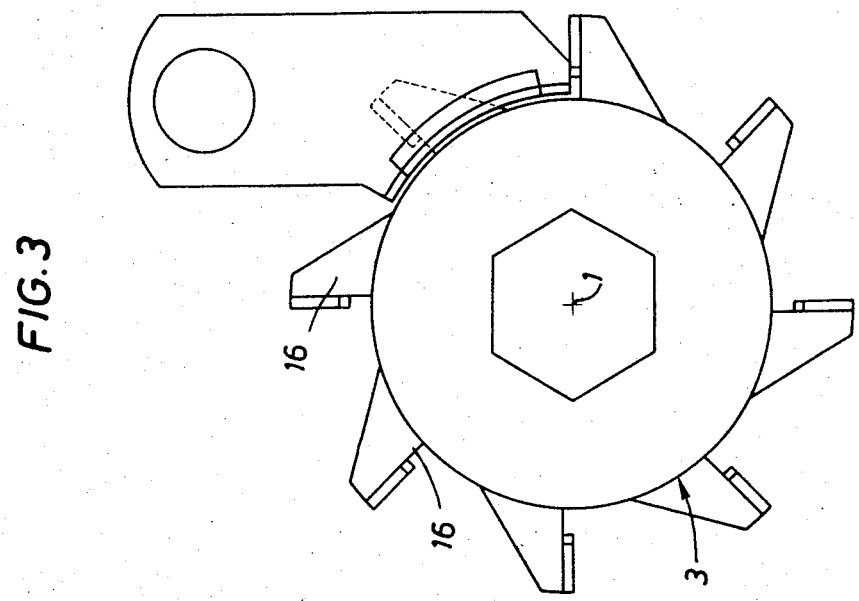
FIG. 3 and 4 are illustrations corresponding to the figures resp.1 and 2, of a second example.
Figure 4:
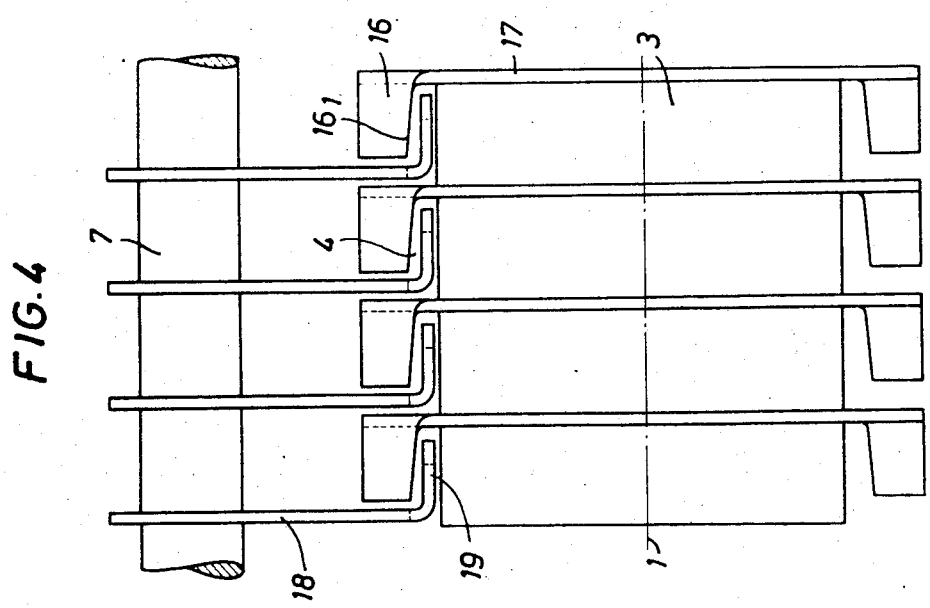

In the embodiment of FIGS. 3 and 4, each of the disks 3 keyed on the shaft 1 has a non notched or slotted peripheral external surface; spigots are here "teeth" 16 which are either shaped on the disks or made of the tooth 16 shaped at the tip of a flange 17 keyed on the shaft 1 between two adjacent disks, the tooth 16 being such as to have its face $16_1$ essentially parallel to the axis of the shaft and at a given distance from the circumference of the associated disk 3 in order to provide between this periphery and the said face $16_1$ a recess identical to the ring-shaped section 4. The scraping fingers 8 are then made of a finger 18 which can be clamped in fixed position on the fixed holder 7, and of an horizontal member 19 which takes place between the face $16_1$ and the periphery of the disk 3.

The proportioning device according to the invention can be easily assembled and serviced, its cost price is very low, and it can be used in conjunction with any sowing-machine or dusting-machine of known type, it allows to clean in a much more complete, and thus efficient, manner the spigotless areas of the spigot cylinder and consequently contributes to the regular distribution of the product.

I claim:

1. A proportioning device for granulated or pulverulent products comprising a body of a generally cylindrical configuration adapted for rotation within a container housing the granular or pulverulent products, a plurality of radially outwardly directed spigots carried by said body, adjacent ones of said spigots being spaced axially and peripherally with the axial spanning being similar thereby forming peripheral rows of spigots with a peripheral gap between adjacent rows, the cross-sectional configuration of said gaps as viewed in side elevation being defined by the combined configurations of axially adjacent spigots which each include an enlarged terminal head and a reduced connecting neck portion, a plurality of stationary scraping fingers adapted to be fixed to the container housing said granular or pulverulent products, and each finger having a terminal tip within and corresponding in configuration to each of said gaps whereby said gaps are continually self-cleaned during the rotation of said body.

2. The proportioning device as defined in claim 1 wherein said cylindrical body is a stack of discs with each row of spigots being carried by an associated disc.

3. The proportioning device as defined in claim 1 wherein said cylindrical body is a stack of discs with each row of spigots being sandwiched between an adjacent pair of discs.

4. The proportioning device as defined in claim 1 wherein each scraping finger and said gaps are of a generally I-shaped configuration as viewed in side elevation.

5. The proportioning device as defined in claim 1 wherein each spigot head has radially innermost and outermost surfaces with each innermost radial surface being parallel to an outer peripheral surface of said cylindrical body.

6. The proportioning device as defined in claim 1 wherein the spigots of at least two rows are circumferentially offset.

7. The proportioning device as defined in claim 1 wherein each scraping finger and said gaps are of a generally L-shaped configuration as viewed in side elevation.

8. The proportioning device as defined in claim 7 wherein each row of spigots is defined by a generally flat disc-shaped plate from which project radially said connecting portions and axially said enlarged terminal heads.

* * * * *